(12) United States Patent
White (10) Patent No.: US 6,519,500 B1
(45) Date of Patent: Feb. 11, 2003

(54) ULTRASONIC OBJECT CONSOLIDATION (75) Inventor: Dawn White, Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 0 days.

(21) Appl. No.: 09/532,432

(22) Filed: Mar. 23, 2000

Related U.S. Application Data (60) Provisional application No. 60/154,250, filed on Sep. 16, 1999, and provisional application No. 60/155,615, filed on Sep. 23, 1999.

(51) Int. Cl.$^7$ .............................................. G06F 19/00
(52) U.S. Cl. ....................... 700/119; 700/182; 156/73.1
(58) Field of Search ........................ 700/117–123, 182; 156/73.1–73.6

(56) References Cited

U.S. PATENT DOCUMENTS

| | | | |
|---|---|---|---|
| 3,932,923 A | 1/1976 | DiMatteo et al. | 29/407.05 |
| 3,959,747 A | 5/1976 | Turski et al. | 333/149 |
| 4,285,752 A | 8/1981 | Higgins | 156/250 |
| 4,327,156 A | 4/1982 | Dillon et al. | 428/568 |
| 4,419,170 A | 12/1983 | Blad | 156/361 |
| 4,575,330 A | 3/1986 | Hull | 425/174.4 |
| 4,665,492 A | 5/1987 | Masters | 700/119 |
| 4,743,733 A * | 5/1988 | Mehta et al. | 219/121.66 |
| 4,752,352 A | 6/1988 | Feygin | 216/33 |
| 4,786,267 A | 11/1988 | Toya et al. | 445/7 |
| 4,863,538 A | 9/1989 | Deckard | 264/497 |
| 5,015,312 A | 5/1991 | Kinzie | 156/63 |
| 5,088,047 A | 2/1992 | Bynum | 700/182 |
| 5,121,329 A | 6/1992 | Crump | 700/119 |

(List continued on next page.)

Primary Examiner—Leo P. Picard
Assistant Examiner—Zoila Cabrera
(74) Attorney, Agent, or Firm—Gifford, Krass, Groh, Sprinkle, Anderson & Citkowski, PC (57) ABSTRACT

A system and a method of fabricating a three-dimensional object on a substrate includes adding material layers incrementally and consolidating the layers by using ultrasonic vibrations and pressure. The layers are placed in position to shape the object by a material feeding unit, and they come in various forms, including flat sheets, segments of tape, strands of filament or single dots of material. The material may be plastic or metallic, and composition may vary discontinuously or gradually from one layer to the next, creating a region of functionally gradient material. The invention permits the construction and repair of dense objects, including fiber-reinforced composites and aerospace structures. Excess material may be removed one or more layers are bonded, including following end of the process after the final object is fabricated. The layers are fed sequentially and additively according to a layer-by-layer computer-model description of the object, which is generated by a computer-aided design/manufacturing (CAD/CAM) system. Ultrasonic welding equipment applicable to the invention preferably includes an ultrasonic generator, a transducer, a booster and a head unit or sonotrode.

44 Claims, 5 Drawing Sheets

U.S. PATENT DOCUMENTS

| | | | |
|---|---|---|---|
| 5,126,529 A | 6/1992 | Weiss et al. | 219/121.6 |
| 5,182,056 A | 1/1993 | Spence et al. | 264/401 |
| 5,203,944 A | 4/1993 | Prinz et al. | 156/247 |
| 5,207,371 A | 5/1993 | Prinz et al. | 228/125 |
| 5,236,637 A | 8/1993 | Hull | 264/401 |
| 5,256,340 A | 10/1993 | Allison et al. | 264/401 |
| 5,260,009 A | 11/1993 | Penn | 264/401 |
| 5,263,130 A | 11/1993 | Pomerantz et al. | 345/418 |
| 5,286,573 A | 2/1994 | Prinz et al. | 264/308 |
| 5,287,435 A | 2/1994 | Cohen et al. | 345/418 |
| 5,301,415 A | 4/1994 | Prinz et al. | 29/458 |
| 5,303,141 A | 4/1994 | Batchelder et al. | 700/29 |
| 5,354,414 A | 10/1994 | Feygin | 216/34 |
| 5,398,193 A | 3/1995 | deAngelis | 700/119 |
| 5,470,651 A | 11/1995 | Milinkovic et al. | 428/325 |
| 5,514,232 A | 5/1996 | Burns | 156/64 |
| 5,578,227 A | 11/1996 | Rabinovich | 219/121.63 |
| 5,594,652 A * | 1/1997 | Penn et al. | 700/119 |
| 5,614,075 A | 3/1997 | Andre, Sr. | 205/67 |
| 5,617,911 A | 4/1997 | Sterett et al. | 164/457 |
| 5,637,175 A | 6/1997 | Feygin et al. | 156/264 |
| 5,669,433 A | 9/1997 | Sterett et al. | 164/46 |
| 5,718,951 A | 2/1998 | Sterett et al. | 427/466 |
| 5,730,817 A | 3/1998 | Feygin et al. | 156/64 |
| 5,746,844 A | 5/1998 | Sterett et al. | 148/522 |
| 5,771,524 A | 6/1998 | Woods et al. | 15/209.1 |
| 5,779,833 A | 7/1998 | Cawley et al. | 156/89.11 |
| 5,787,965 A | 8/1998 | Sterett et al. | 164/155.3 |
| 5,816,472 A | 10/1998 | Linn | 228/1.1 |
| 5,817,199 A | 10/1998 | Brennecke et al. | 156/73.1 |
| 5,851,665 A | 12/1998 | Marcus | 428/357 |
| 5,876,550 A | 3/1999 | Feygin et al. | 156/264 |
| 5,879,489 A | 3/1999 | Burns et al. | 156/64 |
| 5,884,835 A | 3/1999 | Kajiwara et al. | 228/110.1 |
| 5,894,983 A | 4/1999 | Beck et al. | 228/110.1 |
| 5,897,825 A * | 4/1999 | Fruth et al. | 264/401 |
| 5,931,372 A | 8/1999 | Miller | 228/180.5 |
| 5,945,058 A | 8/1999 | Manners et al. | 264/401 |
| 5,960,853 A | 10/1999 | Sterett et al. | 164/271 |
| 5,976,339 A | 11/1999 | Andre, Sr. | 205/70 |
| 6,007,318 A | 12/1999 | Russell et al. | 425/130 |
| 6,129,872 A * | 10/2000 | Jang | 264/75 |
| 6,129,884 A * | 10/2000 | Beers et al. | 264/401 |
| 6,136,252 A * | 10/2000 | Bedal et al. | 264/308 |
| 6,176,953 B1 * | 1/2001 | Landreth et al. | 156/73.3 |

* cited by examiner

ULTRASONIC OBJECT CONSOLIDATION

REFERENCE TO RELATED APPLICATIONS

This application claims priority of U.S. provisional patent application Serial No. 60/154,250 filed Sep. 16, 1999, and U.S. provisional patent application Serial No. 60/155,615 filed Sep. 23, 1999, the entire contents of both of which are incorporated herein by reference.

FIELD OF THE INVENTION

The present invention relates generally to fabrication of objects and prototypes through the sequential deposition of material. More particularly, the invention relates to ultrasonic consolidation.

BACKGROUND OF THE INVENTION

Numerous manufacturing technologies for producing objects by sequentially adding material exist, with the casting of liquid metal being perhaps the oldest such technique. In the past two decades, various processes for fabricating objects to net shape solely through material addition, i.e. without a finishing step such as machining to produce detailed, high-precision features, have been patented and, in a few cases, commercialized.

Most of these additive manufacturing processes either rely on an adhesive, or a solidification process in order to produce a bond between previously deposited material and each incremental volume of material which is added. Although the use of adhesives is convenient, the properties of the adhesive control the properties of the finished object, and this limits the usefulness of such processes in the production of engineering parts and products.

Processes which use solidification transformations result in objects with relatively uniform physical and mechanical properties, because the liquid which is present as each volume of material is added wets the previously deposited material, effectively acting as an adhesive with properties identical to those of the bulk material.

The most commercially successful of these technologies is stereolithography, in which a focused light source (typically an ultraviolet laser) is used to solidify a liquid photocuring polymer. As the laser focal point travels through a vat of liquid polymer, the polymer locally solidifies, and eventually, through appropriate programming of the motion of the focal point, a solid object is built.

Selective laser sintering is another additive manufacturing process in which a laser beam is used. In this process, a bed of solid powder is locally melted by a laser beam traversing over it. The partially melted powder aggregates, producing an object. Direct metal deposition is an improvement over selective laser sintering, and it is the subject of intense research and development around the world. In essence, the process involves the injection of metal powders into a high-power laser beam, while the laser is rastered across a part surface. The powders are melted in the beam, and deposited primarily under the influence of gravity.

Particularly with regard to the production of metal objects, prior-art methods require the presence of liquid metal. Various approaches to the problem include three-dimensional shape melting or shape welding, as described by Edmonds, U.S. Pat. No. 4,775,092, Doyle et al., U.S. Pat. No. 4,812,186, and Prinz et al., U.S. Pat. No. 5,207,371, and laser melting and deposition of powders as described in Lewis et. al., U.S. Pat. No. 5,837,960. Brazing of laminated objects, and closely related to it, infiltration of a low-surface tension and low-melting point alloy to fill voids in objects made by compacting or printing metal powders have also been employed. All of these processes require high temperatures and formation of liquid metals to produce a metal part.

More recently, nickel vapor deposition has been employed as a means of producing nickel shells for net-shape fabrication applications, U.S. Pat. No. 5,470,651. Nickel vapor deposition (NVD) allows thicker shells to be produced as vapor deposition rates are higher than in electroforming (Milinkovic, 1995). However, NVD involves the use of highly toxic gases and requires a specialized reaction chamber. The cost and risk of this technology are both very high.

The presence of liquid metal in a process presents numerous safety and material handling problems. Furthermore, the higher the melting point of the material, the greater these difficulties become. When low melting-point materials, such as solders or tin-based alloys, are used these issues are relatively insignificant. But when engineering materials such as iron, nickel or aluminum-based alloys are employed, these difficulties become important. Safety hazards include fumes, the possibility of metal breakout when reservoirs of liquid metal are required, and high-intensity energy sources and high voltage, when methods such as laser metal deposition, or shape melting are employed. When metal powder is used as a feedstock, as in laser metal deposition, the danger of explosion is very real. Other processes, such as metal spraying to produce net shape objects, result in powder generation as a waste product which may also present an explosion hazard.

The presence of liquid metal in additive manufacturing processes may also detrimentally effect dimensional accuracy of a part when built. The dimensional changes which occur during the liquid-solid transformation in metals are not wholly consistent, and are subject to random noise. This noise results in unpredictable and uncontrollable dimensional inaccuracies in parts built using liquid metal processes, the errors being of the order of 0.001 in to 0.005 in per inch. As part size increases, the errors accumulate, making it impossible to produce accurate parts. Several solutions have been proposed, including the use of a second, subtractive step for addressing the accuracy issues. However, this adds time, cost, and complexity to the process.

Selective laser sintering and laser-aided direct metal deposition are examples of processes which rely on thermal energy which is remotely generated, and transmitted through the object undergoing consolidation to produce a bond. Thermal energy is generated by a laser beam, and transmitted to the metal powder, either in the beam, as in the laser engineered net shaping process, or at the powder bed, as in selective laser sintering, and eventually reaches the location where bonding/consolidation of the growing object occurs.

The transmission of thermal energy results in a number of undesirable side effects. First the process is inefficient in that much more energy must be produced than is needed to produce a joint. Second, the thermal energy is not transported only to the location where it is used. Large volumes of additional material are also heated leading to problems such as residual stresses, curling, the need to cool objects, etc., which have been identified by other inventors. Dimensional accuracy is also difficult to control.

The forging processes now in use for rapid prototyping and tooling generally involve the use of metal powders which are densified under heat, pressure, or both. For example, hot isostatic pressing (HIP) is widely used in the aircraft engine industry. In this process, metal powders are compacted in a can which is subjected to high temperature and pressure. The material creeps to densify fully in the solid state. Cold isostatic pressing, i.e., isostatic high pressure compaction of powders at ambient temperatures can be employed for materials such copper, aluminum and low melting-point alloys. By producing a can of an appropriate shape, a near net-shape object can be formed. Powder forging can also be employed. Powder forging is a high temperature and pressure process conducted in a press in which the load is applied axially to the part rather than isostatically. A drawback of these processes is that they require some form of pattern or tooling, such as a can with a desired shape, or in the case of powder metal tooling, a ceramic or metal mandrel, against which the powders are forged.

The only commercialized low-temperature process for additive manufacturing of engineering scale metal components is electroforming, or plating. This is a very mature technology, which has recently been used to produce shells on near net-shape patterns for objects, usually tooling inserts for injection molding. Electroforming is a very slow process, as it takes up to two weeks to produce a shell 0.25 inches thick in a material such as nickel, which has sufficient strength and wear resistance to be used in permanent tooling. As a result, in rapid prototyping applications, this process is used only to create shells which require backfilling by some secondary material. Metal-powder filled epoxies are most often used, however, ceramic slurries, other plastics, cements, and low-melting point metals have also been used.

As a near net-shape forming technology, electroforming has other drawbacks besides extremely low deposition rate. In the electroforming process, metal salts are dissolved in an aqueous solution. When an electrical current passes through this bath, metal is deposited on the negatively charged surface, which, in net shape electroforming applications such as tooling, is a model which is the inverse of the desired final shape. Aqueous solutions of metal salts are generally toxic. Sludge forms in these baths as a by-product of the process. Both the liquid and the sludge are hazardous materials which must be handled and disposed of properly.

More recently, nickel vapor deposition has been employed as a means of producing nickel shells for netshape fabrication applications, U.S. Pat. No. 5,470,651. Nickel vapor deposition (NVD) allows thicker shells to be produced as vapor deposition rates are higher than in electroforming (Milinkovic, 1995). However, NVD involves the use of highly toxic gases and requires a specialized reaction chamber. The cost and risk of this technology are both very high.

Electroplating or direct metal deposition are also used in the prior art for making objects with functionally gradient materials. Functionally gradient materials are those in which material composition is varied, whether rapidly or gradually, in order to allow a single component to more efficiently meet engineering service requirements. Examples in which such materials are used include injection-molding tools in which a copper zone is co-fabricated with the tool steel, in order to improve heat transfer in certain locations. Other examples are found in the hot zones of turbine engines and rocket motors, where it may be desirable to have a gradual gradient between a metal and a ceramic, or a metal and an intermetallic compound, so that certain areas of a part feature enhanced heat resistance, while others have excellent ductility.

Fabrication of functionally gradient materials often presents difficulties, because the materials may be metallurgically incompatible in the case of rapid variation, or because certain compositions may be very difficult to fabricate in the case of gradual variation. When copper and steel, for instance, are joined by prior-art fusion approaches, they tend to crack.

SUMMARY OF THE INVENTION

This invention is directed to a system and a method of fabricating an object by adding material layers incrementally and consolidating the layers through the use of ultrasonic vibrations and pressure. The layers are placed in position to shape the object by a material feeding unit. The raw material may be provided in various forms, including flat sheets, segments of tape, strands of filament or single dots cut from a wire roll. The material may be metallic or plastic, and its composition may vary discontinuously or gradually from one layer to the next, creating a region of functionally gradient material. Plastic or metal matrix composite material feedstocks incorporating reinforcement materials of various compositions and geometries may also be used.

If excess material is applied due to the feedstock geometry employed, such material may be removed after each layer is bonded, or at the end of the process; that is after sufficient material has been consolidated to realize the final object. A variety of tools may be used for material removal, depending on composition and the target application, including knives, drilling or milling machines, laser cutting beams, or ultrasonic cutting tools.

The consolidation is effected by ultrasonic welding equipment, which includes an ultrasonic generator, a transducer, a booster and a head unit, also called a horn or sonotrode. Ultrasonic vibrations are transmitted through the sonotrode to the common contact surface between two or more adjacent layers, which may include layers next to each other on the same plane, and/or layers stacked on top of each other. The orientation of the sonotrode is preferably adjusted so that the direction of the ultrasonic vibrations is normal to the contact surface when consolidating layers of plastic material, and parallel to the contact surface when consolidating layers of metal.

The layers are fed sequentially and additively according to a layer-by-layer computermodel description of the object, which is generated by a computer-aided design (CAD) system. The CAD system, which holds the layered description of the object, interfaces with a numerical controller, which in turn controls one or more actuators. The actuators impart motion in multiple directions, preferably three orthogonal directions, so that each layer of material is accurately placed in position and clamped under pressure. The actuators also guide the motion of the sonotrode, so that ultrasonic vibrations are transmitted in the direction required through the common contact surfaces of the layers undergoing consolidation.

In different embodiments, the system and method may incorporate the use of support materials to provide suitable substrates for any features of the object, which, when viewed sectionally, are overhanging. A description of the support resides in the CAD system, enabling the support to be built sequentially and additively. The support is preferably composed of less valuable material which is removed by stripping, cutting, dissolution, or by melting, when material having a lower melting-point than that of the object is used. As examples, useful support materials include ceramics, particularly water-soluble ceramics, and metal foils which do not bond but can compress and hold the up the build portion. The support materials may be consolidated using the same power supply and different joining parameters, though not every layer of the support need be bonded to the next layer, nor does the support need be fully consolidated. Indeed, weakly or partially bonded support material may be removed by breaking it up and shaking it loose using ultrasonic vibrations of appropriate frequency.

Other embodiments of the invention are directed to fabricating fiber-reinforced composites, including composites with continuous ceramic fibers in a metal matrix. According to one aspect, a layer of fibers is covered with a layer of a metallic powder, the surface of which is then partially consolidated by sweeping the surface with laser beam. Full consolidation is effected by the sonotrode of the ultrasonic welder. In a different embodiment, a layer of metallic foil is fed on top the powder and the sonotrode is used to fully consolidate the underlying structure.

Another aspect is directed to fabricating an object by tape lay-up. Tape from a spool is fed and cut into segments to create successive sections of the object, the direction of the tape segments preferably alternating between two orthogonal directions from section to section. The sonotrode is preferably positioned to consolidate the horizontal surfaces between the sections and the vertical surfaces between adjacent segments of tape on the same section.

Material may also be provided in the form of wire or strip fed from a spool. Such a configuration is particularly applicable to repairing and overhauling worn or damaged region of an object, wherein a sonotrode having a cutting tip is used to separate a dot of material and ultrasonically welds it in place.

BRIEF DESCRIPTION OF THE DRAWINGS

FIG. 7 is a schematic diagram illustrating an embodiment of the invention in which the material layers are tape segments;

DETAILED DESCRIPTION OF THE INVENTION

The subject invention is directed to the creation of three-dimensional objects by depositing and consolidating successive layers of material under pressure using ultrasonic vibrations applied at material contact surfaces. When this process is applied to metals, in particular, a true metallurgical bond is created at the interface, although no liquid (molten) metal, and no high temperatures, are involved. The ultrasonic consolidation of the metal-metal interface occurs in a solid (dry) state environment, and it is therefore a clean and safe process requiring no dies or molds.

The temperature rise at the interface between layers is below the melting point, typically 35% to 50% of the melting point for most metals, and any heating that occurs is confined to a region a few microns thick. Rapid heat dissipation from the region of bonding ensures that minimal residual stresses arise. As such, post-processing to relieve residual stresses is typically not necessary. Similarly, phase transformation is avoided, and the final product has improved dimensional accuracy and resistance to fatigue and cracking. Due to the low-temperature, solid-state nature of the process, energy costs are as much as 95% less than in competing technologies, allowing the process to be practiced in facilities such as offices which do not have high-voltage electrical service.

The invention will now be described in detail with reference to the figures. The main components of an ultrasonic welding unit adapted for use by the invention are shown schematically in FIG. 1. An ultrasonic generator or power supply 1 receives main grid electricity at a low frequency, preferably in the range of 50 to 60 Hz, and at a low voltage of 120V or 240 V AC. The generator converts the input to an output at a higher voltage, preferably having a frequency in the range of 15 to 60 kHz. A useful working frequency is 20 kHz, which is above the normal range of human hearing of about 18 kHz. Systems employing higher frequencies of 40 kHz to 60 kHz with lower amplitude vibrations are preferably employed for fragile materials, such as very thin foils, wires of very small diameter, or substrates which are easily damaged.

Figure 1:
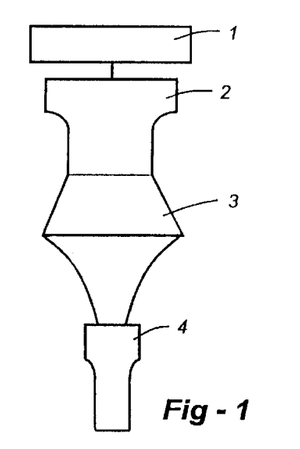
FIG. 1 is a schematic diagram showing the components of an ultrasonic welding unit; applicable to the invention

The high frequency output of the generator is transmitted to a transducer or converter 2, which converts the signal to mechanical vibratory energy at the same ultrasonic frequencies. State-of-the art transducers operate on piezoelectric principles and incorporate discs or rings made of piezoelectric material, such as piezoelectric ceramic crystals, which are compressed between two metal sections. An advanced generator features automatic tuning adjustment in relation to the transducer so that a constant amplitude of vibration is maintained during the operation of the welding unit.

The peak-to-peak amplitude of the vibration is 20 microns (0.0008 in.) for a typical 20 kHz transducer and 9 microns (0.00035 in.) for a 40 kHz transducer. If a different amplitude is required, a booster 3 is attached to the transducer. The vibratory energy of the transducer is transmitted to the booster 3, which decreases or increases the amplitude of the ultrasonic waves. The waves are then transmitted to the horn, which is a custom-made acoustic tool that comes in contact with the workpieces. The horn is also called a sonotrode or head unit. The horn may be designed as a tool-holder carrying a tool bit, or it may be provided in one integrated piece incorporating specific geometric features. For ultrasonic welding of plastics, the sonotrode is made from aluminum or titanium. For ultrasonic welding of metals the sonotrode is preferably made of tool steel, and it may be manufactured as a unitary component.

The workpieces or layers are held under pressure between the contact surface of the sonotrode and a substrate or anvil. The contacting surfaces of the sonotrode and anvil are roughened to provide a secure grip. Pneumatically operated jaws or other fixtures are used to insert and remove the parts to be welded, typically in conjunction with automated feeding mechanisms and automated positioning controllers.

Figure 2:
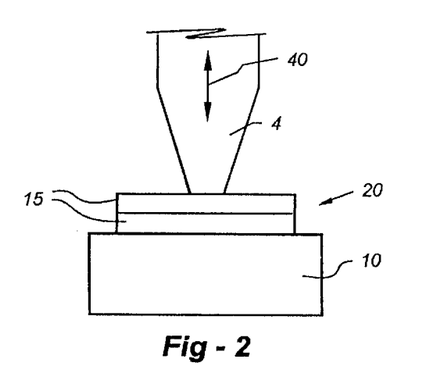
FIG. 2 shows a schematic ultrasonic welding process for plastics according to the invention.

A basic ultrasonic welding arrangement suitable for plastics is shown in FIG. 2. Two layers of plastic 15 are clamped under pressure between an anvil 10 and a sonotrode 4, which transmits vibrations 40 in a direction perpendicular to the common surface 20 of the layers 15 to be joined. When the invention is used to form objects made of plastic materials, the heating generated at the interface of successive layers is high enough to cause plastic flow and localized melting of the layers. The plastic materials, which may be used for forming objects by the present method, include the class of thermoplastics, either amorphous or semicrystalline. Common amorphous polymer materials, which may be ultrasonically consolidated or bonded, include acrylic, polycarbonate, polystyrene, PVC and ABS. Amorphous thermoplastics do not have a defined melting point, but gradually flow under heating, and gradually solidify when heating is removed. Common semicrystalline polymers, which may be ultrasonically consolidated, include nylon, polyester, polyethylene, polypropylene, acetal, polyetherimide and polyphenylene sulfide. Semicrystalline polymers have a well-defined melting point, which must be reached for the material to flow.

For plastic materials, the ultrasonic welder is preferably positioned so that the vibrations transmitted by the sonotrode are normal to the surfaces undergoing consolidation. The vibrations create frictional heating, which causes gradual localized plastic flow in amorphous plastics. When the vibrations stop, the gradual solidification process creates a seamless bond. For semicrystalline materials, higher amplitude vibrations are required in order for localized melting to occur.

Figure 3:
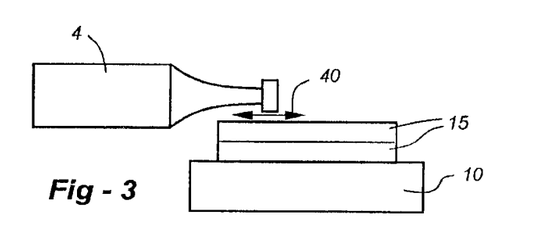
FIG. 3 shows schematically a basic ultrasonic welding process for metals.

FIG. 3 illustrates schematically the process of ultrasonic welding of metals. Two metal workpieces 15 are pressed-.together between the sonotrode 4 and the anvil 10. The lower piece is held stationary by the anvil, while the upper piece vibrates with the ultrasonic frequency imparted by the sonotrode. The vibration breaks up and removes oxides from the interface resulting in an atomically clean surface. Pressure on the atomically clean interface causes diffusion of atoms to occur within a region of 10 microns on either side of the interface, resulting in a true metallurgical bond without melting, phase transformation or high energy.

In the fabrication of objects through additive manufacturing, the thickness of the layers is typically in the range of 0.001 to 0.005 inches, in order to achieve the desired dimensional accuracy. This is near the range of foil thickness to which ultrasonic joining of metals is best applied, and it is therefore perfectly suited for the purpose of ultrasonic consolidation of objects according to the invention. It is also possible to consolidate more than two layers of foil at a time, depending on their combined thickness.

Figure 4:
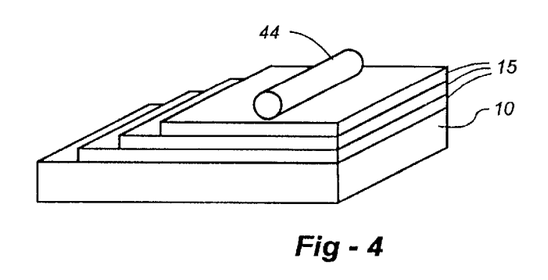
FIG. 4 is a schematic diagram illustrating an embodiment of the invention in which the material layers are sheets.

FIG. 4 shows an object being fabricated by successive consolidation of layers of material 15 provided in sheet form. The sonotrode has an end piece in the form of a roller 44 and applies the vibrations over the surface of each layer until the layer is consolidated with the one underneath. Foil material can be supplied in sheets or fed from a roll. The foil can be consolidated into layers and cut according to the required geometry following consolidation, or it can be cut first, then consolidated.

When the process is used to produce features which are overhanging, cantilevered, or enclosed, a support material may be used to prevent the overhanging or enclosed feature from collapsing as material is added to the growing part. An exception would be the case wherein a filament or wire is used as a feedstock which is applied continuously, or as "dots" using five or more axes of motion in the work head or the build platform, such that material is always deposited on an essentially vertical surface, eliminating the need for supports.

Unlike some other methods of performing freeform fabrication, ultrasonic object consolidation requires a certain degree of rigidity in the support structures. This is because the mechanism of ultrasonic joining requires that material being deposited on an object being built, vibrate, under a slight load, at ultrasonic frequencies and very small amplitudes with respect to a the surface on which it is being deposited. If the support structure effectively damps the applied vibrations, no bond will form between the previously deposited material and the increment of material being applied.

An ideal support material for free form fabrication will be low in cost, easily applied and easily removed, and will not interfere with the operation of the process. The requirement for rigidity in the support for ultrasonic object consolidation mean that obvious support materials such as adhesive backed paper and most plastics are unsuitable for use as support material during ultrasonic object consolidation.

Support materials may be applied around precut foils to supply a support structure, or applied in layers and consolidated, as necessary, by the same or another sonotrode, perhaps requiring adjustment depending upon the type of support material being used. When the entire process is fully automated, another ultrasonic welding unit may be dedicated entirely to fabricating the support structure, based on a layer-by-layer description of the support created by a CAD system which interfaces with a numerically-controlled actuation system. The actuators operate to control the relative motion of each sonotrode used, the object undergoing consolidation, any support material, and the anvil or substrate.

Different techniques may be used to supply support structures with sufficient rigidity for use with ultrasonic consolidation. These include low melting point alloys which can be ultrasonically consolidated. Certain tin alloys such as 96.5 Sn, 3.5 Ag; and 91 Sn, 9 Zn, for example, can be ultrasonically joined, as can brasses and other copper alloys. Low melting point alloys which can be ultrasonically joined, and which are melted readily at temperatures much lower than the melting point of engineering materials such as aluminum based, nickel based or iron based alloys, are good support alloys for ultrasonic object consolidation. Examples include 96.5 Sn, 3.5 Ag, 58 Bi, 42 Sn; and 77 Sn, 20 In, 3 Ag. There are a number of tin based solders which can be ultrasonically joined, and have melting points of around 200° C.

Another suitable support material is stainless steel. Although stainless steel is a high melting point material, it ultrasonically consolidates under conditions very different from those required to join non-ferrous material such as brasses or aluminum alloys. Thus, stainless steel shim stock, which has been roughened by grit blasting makes a good support material. Stainless steel shims in either sheet or tape widths can be cut to fit "unwanted" volumes under overhanging or enclosed features. When a build material such as an aluminum alloy or brass is consolidated above it, the stainless steel tapes will compress, forming a rigid support, but will not weld. When the build is completed, the tapes can be shaken out from around the wanted structure.

Very strong high melting point waxes are also support structure candidates. Some of these waxes are used in jewelry making, and can be deposited in empty volumes (enclosed features) or under cantilevered features. Similarly, certain ceramics, particularly solgels, and water soluble ceramics which can be essentially slipcast incrementally into closed volumes are suitable for rigidly supporting a structure being built, and can be readily removed.

Figure 5:
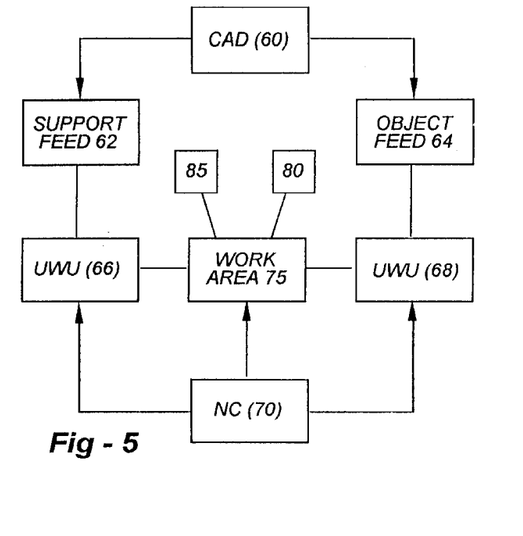
FIG. 5 is a schematic diagram of an automated system according to the invention.
Figure 6:
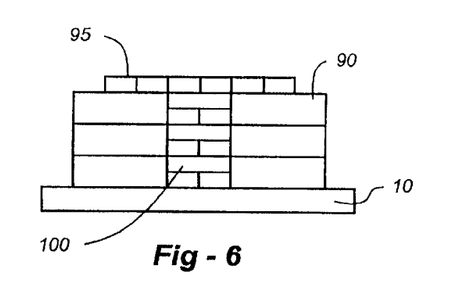
FIG. 6 illustrates the use of support materials to fabricate an object with overhanging parts.

FIG. 5 is a schematic representation of an automated system for fabricating objects according to the invention. A computer-aided design unit 60 provides a layer-by-layer description of the object and of the support, as needed. The object material is fed onto the work area 75 by an object-material feed unit 64. The support material is fed onto the work area 75 by a support-material feed unit 62. The feed units may be combined into one when the shapes of the object and support layers are compatible, for instance sheets of plastic are used for the support and sheets of aluminum foil for the object. In general, two different feed units are required. As shown in FIG. 6, the object may be fabricated by consolidating segments of tape 100 or filament or dots of material, as described below in other embodiments of the invention, while the support for overhanging parts 95 of the object may be constructed by adding layers of support material 90.

The object layers may be either precut, or excess object may be removed by an object removing unit 80, which could be a mechanical or ultrasonic knife, drill, or milling tool, or a laser beam. If used, support material may be removed by a removing unit 85. Sporadic ultrasonic spot-welding of the support material may be limited to the extent necessary to provide a rigid substrate for overhanging parts of the object, thereby facilitating rapid removal of the support by cutting through thin, unwelded sections of the support structure.

The CAD system 60 interfaces with a numerical controller 70, which controls an actuation system (not shown). The actuation system brings the support feed unit 62, the support ultrasonic welding unit 66, the object feed unit 64 and the object ultrasonic welding unit 68 into proper position in the work area 75, so that the ultrasonic consolidation of the layers takes place according to the CAD description of the object and support. The actuation system also controls the vertical motion of the substrate or anvil and the motion of any additional vertical clamps required by the application, so that clamping pressure may be applied on two layers undergoing consolidation.

Figure 7A:
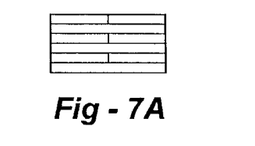
FIG. 7a shows a stacking pattern for tape lay-up.

Feedstock in the form of sheets is often difficult to handle and maintain under uniform in-plane tension and pressure orthogonal to its plane; it may require very wide rollers to be fitted to the sonotrode, and successive passes of the roller to cover the entire sheet. A preferred approach with respect to wide objects is to build such an object from layers of material which are cut from a roll of tape. FIGS. 7a through 7d illustrate the building of an object by tape lay-up. FIG. 7a shows a typical lamination stacking pattern, in which the layers of tape forming one section of the object have a direction which is at a 90° angle with the direction of the layers of tape forming the next section of the object.

Figure 7B:
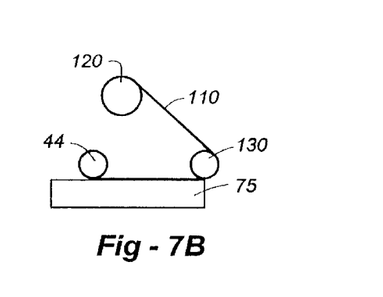
FIG. 7b shows a basic feed arrangement for tape stock.
Figure 7C:
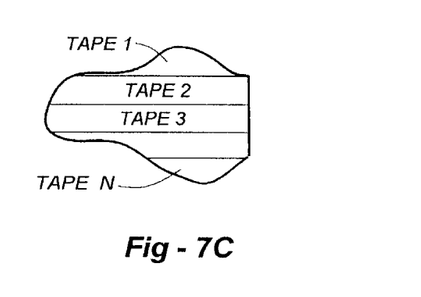
FIG. 7c is a drawing of a horizontal section of an object fabricated by tape lay-up.
Figure 7D:
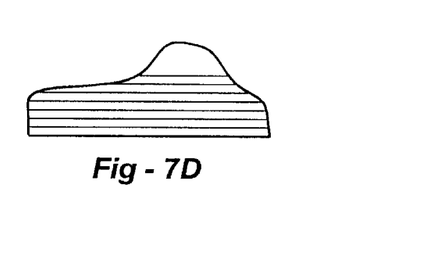
FIG. 7d is a drawing of vertical section of an object fabricated by tape lay-up.

The set-up of the operation is shown in FIG. 7b. A feed spool 120 holds the tape 110, which passes through a tension roll 130 and is fed on to the work area 75 to be consolidated with previous layers by the roller 44 of a sonotrode. The tape is usually 1 to 2 inches wide. FIG. 7c is a drawing of a horizontal section of the object showing adjacent tape segments, and FIG. 7d is a drawing of a vertical section of the object showing the vertically stacked sections.

For this process, ultrasonic vibrations are preferably transmitted in two orthogonal directions, namely, between the horizontal sections, and between the vertical surfaces of adjacent segments of tape forming each section. Such a configuration permits full consolidation, so that the bond lines which are visible in the stacking pattern of FIG. 7(a), are no longer visible after consolidation. In this embodiment, the layering and stacking may take advantage of tape-laying art methods combined with three-dimensional stacking techniques, including those of DiMatteo, U.S. Pat. No. 3,932,923, which is incorporated herein by reference.

Figure 8:
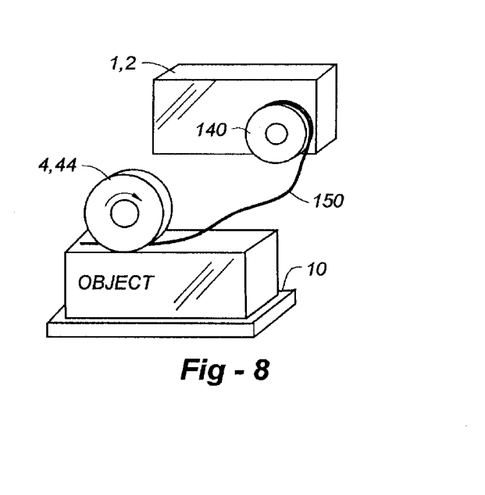
FIG. 8 is a schematic diagram illustrating an embodiment of the invention in which the material layers are pieces of filament.

FIG. 8 is a schematic diagram illustrating a different embodiment of the invention in which the material layers are in the form of tape, filament or wire 150, which is fed from a spool of wire 140. The object is built on a substrate 10 and consolidated by a sonotrode 4 equipped with a roller head 44. A numerical controller, not shown, allows an actuation system (not shown) to impart horizontal (XY) motion to the ultrasonic welding unit and the wire feed, and vertical (Z) motion to the substrate 10.

Figure 9:
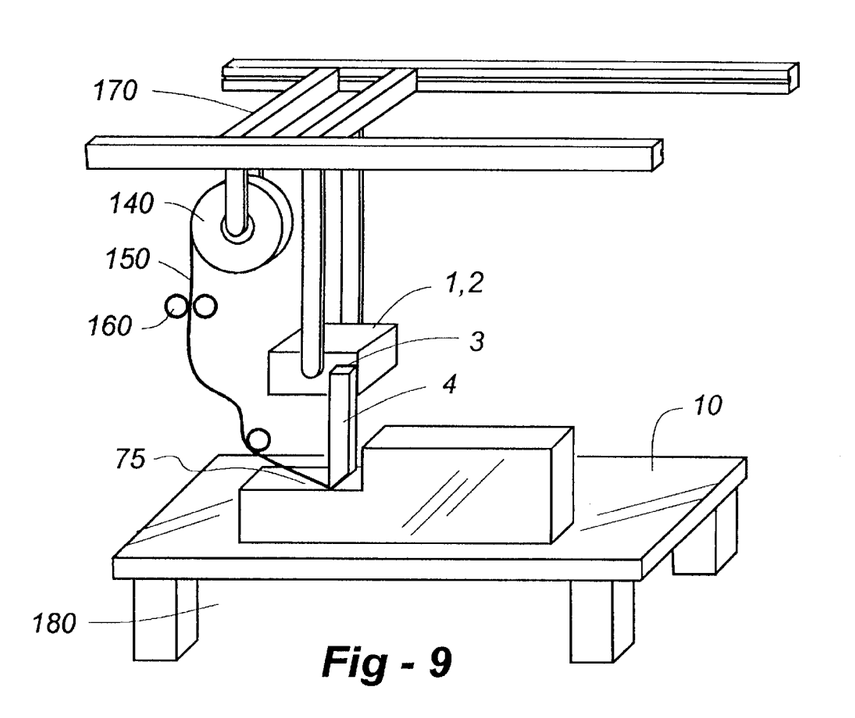
FIG. 9 is a schematic diagram illustrating an embodiment of the invention in which the material layers are dots of wire.

FIG. 9 is a schematic diagram illustrating yet a further embodiment of the invention in which the material layers are dots of wire. The wire 150 is stored in a spool 140 and passes through guide rolls 160 onto the work area 75 of the object being built. The sonotrode 4 has a tip designed to cut dots of wire in 50–500 micron increments. The substrate 10 has a controlled motion 180 in the vertical direction, and the ultrasonic welding unit which includes the generator 1, converter 2 and booster 3 attached to the sonotrode 4 is mounted on a frame 170 which imparts horizontal (XY) motion. The feedstock supply 140 is also mounted on the same frame 170 and has a controlled XY motion.

The point-wise application of dots of material, as illustrated in FIG. 9, allows the fabrication of objects requiring precise dimensioning and detailing, and it is particularly suited for building objects requiring application of materials with different composition. It is possible, for example, to join molybdenum (Mo) to both copper (Cu) and aluminum (Al), both of which are impossible to alloy or difficult to join with molybdenum using prior-art technologies.

Figure 10A:
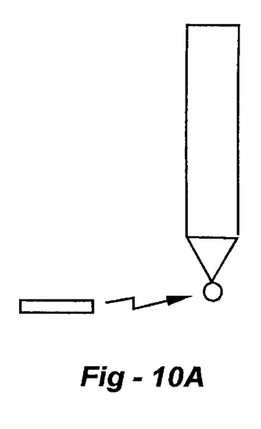
FIG. 10a is a drawing which shows how a small ball or dot of material may be produced for use by the invention.
Figure 10B:
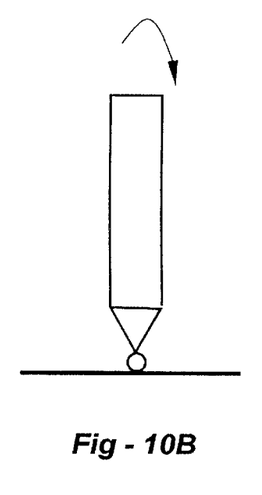
FIG. 10b is a drawing which shows how the ball or dot is deposited on a surface.
Figure 10C:
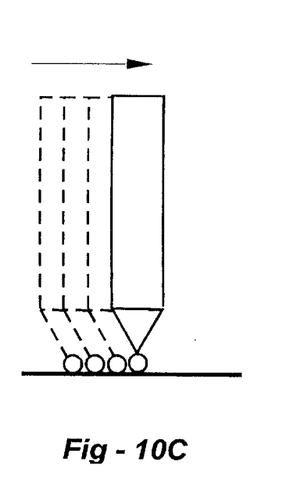
FIG. 10c is a drawing which shows the tool use to form the ball or dot is withdrawn.

The method of material deposition employed in wire bonding can also be used in "dot wise" material application. As illustrated in FIG. 10a, wire bonding employs an electric arc to melt a small volume of material from a fine wire feedstock. This droplet detaches from the wire, and falls onto the workpiece (FIG. 10b), and the arc-generating tool is withdrawn (FIG. 10c). According to the invention, a small, low power ultrasonic horn with a small contact surface contacts the droplet, and ultrasonically bonds it to the workpiece. By controlling the wire diameter, and the amount of energy in the arc, the droplet size can be controlled. Typical droplet dimensions are on the order of tens of microns. This process is used to bond wires to substrates in the electronics industry, and has not been used for free form fabrication. However, it has important advantages when employed as described here. A major advantage is the ability to produce very fine features in a wide range of materials.

In the case of solid free form fabrication, the droplets are formed and allowed to fall on the substrate, or on previously deposited material layers. They are located to overlap somewhat, so that when the ultrasonic horn contacts them and consolidates them, they deform and are forced into intimate contact with previously deposited material, eliminating voids and porosity from the consolidated structure. A precision motion platform capable of micron positioning and stepping of the type used in electronics fabrication is employed to ensure accurate droplet placement.

Figures 11, 12:
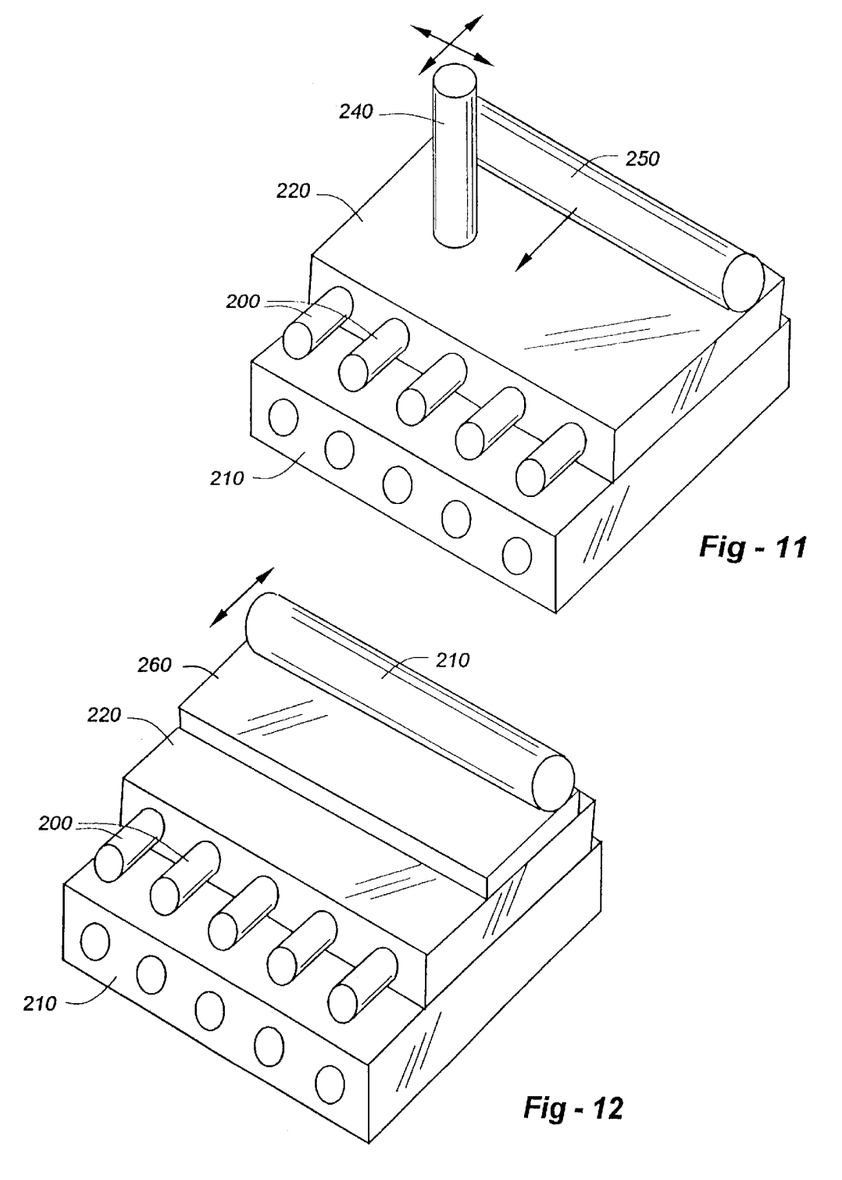
FIG. 11 is a schematic diagram illustrating an embodiment of the invention in which the fabricated object is a fiber-reinforced composite.
FIG. 12 is a schematic diagram illustrating an embodiment of the invention in which the fabricated object is a fiber-reinforced composite.

FIG. 11 is a schematic diagram illustrating an alternative embodiment of the invention in which the fabricated object is a fiber-reinforced composite. The reinforcing fibers 200 are preferably continuous ceramic fibers and the matrix is aluminum or another metal of interest, such as a nickel- or titanium-based alloy. First, a layer of fibers 200 is fed on the previously deposited material 210, and then aluminum powder 220 is deposited over to cover the layer of fibers up to a desired thickness. A laser beam 240 is passed of over the layer of powder sweeping the surface of the powder layer in two directions in a raster-type pattern.

The laser beam preferably forms part of a laser-aided direct metal deposition system, in which the powder is fed through the same nozzle as the laser beam. Such an arrangement is similar to a selective laser sintering system, in which the laser partially agglomerates a bed of previously deposited powder. The laser beam is only used to partially consolidate the surface of the powder layer. Full consolidation of the powder takes place at a second stage by passing a roller-tipped sonotrode 250 over the partially consolidated layer of powder. The process is then repeated until a fiber-reinforced object is built. The same process can be used to manufacture composite tape for use in other applications. This process combines the advantages of laser-aided direct metal deposition and ultrasonic welding. The laser beam 240 provides a surface that can support the function of the ultrasonic roller 250, and the ultrasonic roller consolidates the powder matrix 220 without high-temperature heating or melting.

FIG. 12 is a schematic diagram illustrating another alternative embodiment of the invention in which the fabricated object is a fiber-reinforced composite. This process avoids the laser beam altogether. The support for the ultrasonic roller 250 is provided in this embodiment by an aluminum foil 260. The roller 250 consolidates the powder and foil in one step, and the process is repeated.

Figure 13:
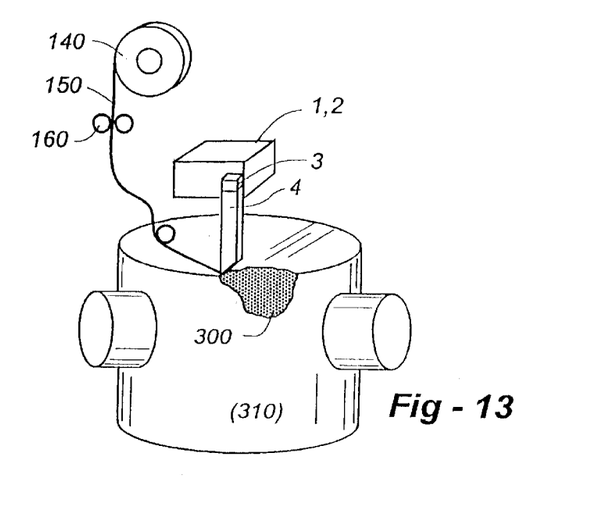
FIG. 13 is a schematic diagram illustrating an embodiment of the invention for repairing a worn region of an object.

FIG. 13 is a schematic diagram illustrating a different alternative embodiment of the invention for repairing a worn region 300 of an object 310. To effect the repair, repair material filament 150 is fed from the spool 140 to the worn region under the sonotrode 4, which is equipped with a cutting tip, so that it cuts and consolidates small pieces of filament onto the worn region. Support material may be fed and consolidated, as needed, as described with respect to FIG. 6.

The method and system of the present invention may also be used to create functionally gradient materials. Ultrasonic additive manufacturing has unique benefits as a means of preparing functionally gradient, net-shape objects in comparison to prior art. The low-temperature, solid-state nature of the process means that materials which are very difficult to join metallurgically using prior-art fusion approaches can be easily joined by ultrasonic consolidation. For example, copper and steel, which tend to crack when joined by fusion methods, can be readily consolidated using ultrasonic energy. In addition, the dotwise process of ultrasonic object consolidation, which was described above in relation to FIG. 9, can be used to add material of gradually varying compositions to produce objects with wide range of compositions. Furthermore, feed stocks of two widely disparate compositions can be applied in gradually varying amounts to produce a functionally gradient zone.

Figure 14A:
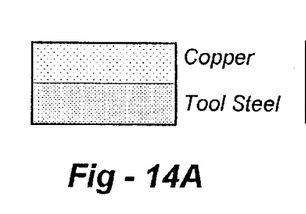
FIG. 14a illustrates a discontinuous change in material composition.
Figure 14B:
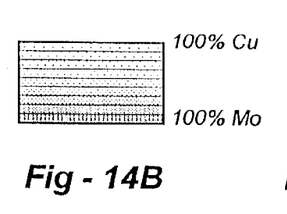
FIG. 14b illustrates a gradual change in material composition.
Figure 14C:
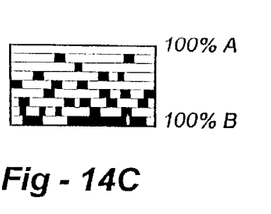
FIG. 14c shows a gradual change in material composition produced by the dot-wise application of two distinct materials.

FIGS. 14a through 14c show how changes in composition may be effected during the fabrication of the object by the process of the present invention. The layers may be deposited and consolidated by using sheet, filament or dot-wise ultrasonic object consolidation. FIG. 14a, for example, shows a discontinuous change from tool steel to copper. FIG. 14b shows a gradual change from molybdenum to copper using sheet or filament material of varying composition. FIG. 14c shows a functionally gradient material produced by the dot-wise application of two materials A and B. The bottom layer is 100% material B, with successive layers incorporating an increasing number of dots of material A, until the top layer, comprising 100% of material A, is reached.

Figure 15A:
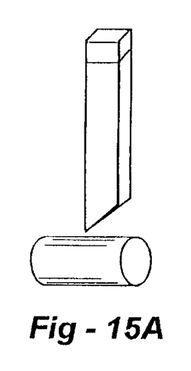
FIG. 15a shows how a sonotrode and feedstock are aligned for cutting.
Figure 15B:
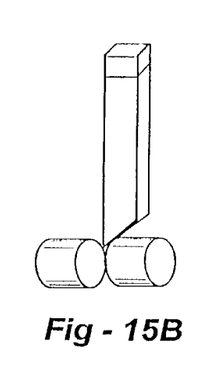
FIG. 15b illustrates a feedstock being severed.
Figure 15C:
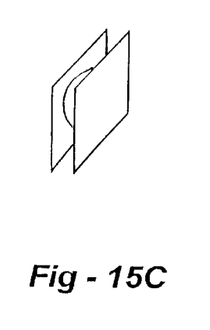
FIG. 15c depicts a bonded increment of material having a shape dictated by sonotrode geometry and motion.

Sonotrodes applicable to the invention include applicator tips or points that first cut feedstock and then bond the cut segment to previously deposited material. FIG. 15a shows a sonotrode with a cutting point against feedstock 450. FIG. 15b shows a sonotrode 4 cutting the feedstock 450 in two pieces and joining one piece 500 to the adjacent material. The geometry and motion of the sonotrode can be designed to shape as it bonds the material increments, as illustrated in FIG. 15c.

The invention is particularly useful in manufacturing structures used in aerospace applications, such as airframes and aircraft engine structural components. Titanium and titanium alloys, such as Ti-6Al-4V and Ti-5Al-2.5Sn are now used for such structures, but they are difficult to form and/or machine. Ultrasonic bonding of monolithic, composite or functionally gradient materials from feedstock including titanium alloys, niobium, rhenium, nickel-based alloys and other alloys of interest, can be used to bond sequentially strips, filaments or particles to produce dense objects for aerospace applications. In the case of ultrasonic bonding of titanium, which does not form oxides at low temperature, a pressure of 1.5 to 2.5 ksi is sufficient to join 0.5 mm thick sheets at ultrasonic energy level of 2 kW, causing some atomic diffusion across the interface.

In addition to being suitable for the manufacture of prototype and production objects of conventional engineering dimensions, ultrasonic object consolidation according to the invention may be employed to produce miniature devices of various types. Examples include electronic components such as wiring, circuits, and microelectromechanical (MEMs) devices which may incorporate miniaturized gears, beams, etc. to produce integrated devices such as sensors, or miniaturized actuators. This scale of fabrication is sometimes referred to a mesoscale manufacturing, to differentiate it from the "micro" manufacturing involved in transistors, integrated circuits, and so forth.

Ultrasonic object consolidation is well suited to mesoscale manufacturing, since it is possible to fabricate very small, yet metallurgically bonded structures from a range of materials using this technique. In this application, a very high frequency power supply, preferably 60 kHz may be employed, along with a very fine wire feed stock using a miniaturized apparatus of the type illustrated in FIG. 9. Alternative applications for this type of ultrasonic object consolidation include MEMS, certain types of specialized electronics, and advanced wiring and sensor systems for automobiles, which are moving to more specialized electrical systems as vehicular electronic content increases.

I claim:

1. A method of fabricating an object through ultrasonic consolidation, comprising the steps of:
   providing a description of the object to be fabricated;
   providing a plurality of material layers having contact surfaces therebetween;
   forming the object in accordance with the description by trasmitting ultrasonic vibrations to one or more of the contact surfaces, thereby consolidating the layers of material directly to one another without melting the material in bulk; and
   removing any excess material.

2. The method of claim 1, wherein the material layers are composed of sheets, elongated tapes, filaments, dots or droplets.

3. The method of claim 1, wherein successive layers of the material define a discontinuous or gradual change in material composition.

4. The method of claim 1, wherein the step of ultrasonically consolidating the material layers uses energy having a direction which is substantially perpendicular or parallel to the layers.

5. The method of claim 1, wherein the description of the object is provided in the form of a computer-aided design or manufacturing (CAD/CAM) file.

6. The method of claim 1, wherein a layer is cut into a shape corresponding to the description of the object prior to the step of ultrasonically bonding that layer.

7. The method of claim 1, wherein a plurality of layers are ultrasonically bonded then trimmed in accordance with the description of the object.

8. The method of claim 1, wherein the layers are ultrasonically bonded one layer at a time.

9. The method of claim 1, wherein alternating layers of reinforcement fibers and metallic powder are used to fabricate a metal-matrix composite object.

10. The method of claim 9, further including the step of consolidating the metallic powder through laser-aided heating.

11. The method of claim 9, further including at least one layer of metallic foil.

12. The method of claim 9, wherein the fibers are continuous ceramic fibers.

13. The method of claim 9, wherein the object is a fiber-reinforced composite tape.

14. The method of claim 9, wherein the reinforcement fibers assume a direction determined by the description of the object.

15. The method of claim 9, wherein the reinforcement fibers cross each other in successive layers for added strength.

16. The method of claim 1, wherein:
   the material is provided in the form of a tape having a width.

17. The method of claim 16, wherein the description of the object takes the width of the tape into account.

18. The method of claim 1, wherein:
   the object includes an overhanging, cantilevered or enclosed feature; and
   support material is used to support the feature.

19. The method of claim 18, wherein the support material is sufficiently rigid to permit the ultrasonic consolidation of subsequent layers.

20. The method of claim 18, wherein ultrasonic vibrations are not damped by the support material.

21. The method of claim 18, wherein the support material is a low-melting-point alloy including solders, copper-based brazes, nickel-based brazes or titanium-based brazes.

22. The method of claim 18, wherein the support material is a different high melting point material which ultrasonically consolidates under very different conditions from the alloy which is being used to produce the object.

23. The method of claim 18, wherein the support material is supplied in the form of tapes or sheets which are ultrasonically consolidated to form a support structure.

24. The method of claim 18, wherein the support material is roughened through mechanical or chemical processing to ensure that adjacent, unconsolidated layers do not slip against each in the presence of ultrasonic vibrations.

25. The method of claim 18, wherein the support material is cut and applied to ensure that it can be shaken or otherwise easily removed from the object being fabricated.

26. The method of claim 18, wherein the support material is applied as a liquid, but hardens to produce a rigid support structure.

27. The method of claim 26, wherein slip-cast ceramics, freeze-cast ceramics, solgels, or hard, sufficiently high-melting point waxes are used as the support material.

28. The method of claim 1, further including the step of providing a computer-controlled actuation system operative to automatically place the material layers in position prior to consolidation.

29. The method of claim 1, wherein the object is a repair of an existing article.

30. A method of fabricating an object through ultrasonic consolidation, comprising the steps of:
   a) providing a description of the object to be fabricated;
   b) providing a plurality of material layers having contact surfaces therebetween;
   c) bonding the material layers directly to one another by transmiting ultrasonic vibrations to one or more of the contact surfaces to form a section of the object without melting the material in bulk;
   d) repeating steps b) and c) to form a plurality of sections of the object;
   e) ultrasonically bonding at least two sections of the object at a time until the object is formed; and
   f) removing any excess material from the object.

31. The method of claim 30, wherein the material layers are dots of material, and the dots are cut from a filament.

32. The method of claim 30, wherein the description of the object is provided in the form of a computer-aided design (CAD) file, and wherein the method includes the additional step of:

provi­ding a computer-controlled actuation system to place the material layers in position to form the object.

33. The method of claim 30, wherein at least two successive layers of the material define a discontinuous or gradual change in material composition.

34. A system for fabricating an object through ultrasonic consolidation, comprising:

a memory for storing a description of the object;

a material feeder for providing successive layers of material with contact surfaces therebetween;

a source of ultrasonic vibrations operative to join one or more layers of the material directly to one another at their contact surfaces without melting the material in bulk; and a controller operative to coordinate the addition of successive layers through the material feeder and control the source of ultrasonic vibrations to consolidate the layers in accordance with the description of the object.

35. The system of claim 34, further including an actuation system for imparting relative motion between the material feeder and source of ultrasonic vibrations sufficient to fabricate three-dimensional objects.

36. The system of claim 34, further including a material-removing unit for removing excess material not required to form the object.

37. The system of claim 36, wherein the material-removing unit includes a knife, drill, laser beam, milling machine or ultrasonic machining tool.

38. The system of claim 34, wherein the material is plastic.

39. The system of claim 38, wherein the ultrasonic vibrations have direction perpendicular to the plane of the contact surfaces.

40. The system of claim 34, wherein the material is metal.

41. The system of claim 40, wherein the ultrasonic vibrations have direction parallel to the plane of the contact surfaces.

42. The system of claim 34, wherein the material is provided in the form of sheets, tapes, filaments, dots or droplets.

43. The system of claim 34, further including:

a support-material feeder; and a support-material removing unit for removing excess support material not required to form the object.

44. The system of claim 34, wherein the object is a repair to an existing article.

* * * * *